3,214,385
REACTIVATION OF SPENT PALLADIUM-ON-CARBON HYDROGENATION CATALYST
John M. Kolyer, Hightstown, N.J., assignor to FMC Corporation, New York, N.Y., a corporation of Delaware
No Drawing. Filed Dec. 20, 1961, Ser. No. 160,894
2 Claims. (Cl. 252—412)

This invention relates to the preparation of butyrolactone, and more particularly, to the reactivation of palladium-on-carbon catalysts used in the preparation of butyrolactone by the hydrogenation of succinic anhydride.

Butyrolactone is commercially prepared at the present time by a 3-step process involving the reaction of acetylene and formaldehyde to produce 2-butyne-1,4-diol. The 2-butyne-1,4-diol is then reduced to 1,4-butanediol, which is catalytically dehydrogenated to butyrolactone.

In a copending application of B. Franko-Filipasic, J. Kolyer and R. Burks, Serial No. 160,893, filed December 20, 1961, now Patent No. 3,113,138, a novel process for the preparation of butyrolactone in high yield is disclosed. By this process butyrolactone is prepared by the liquid phase hydrogenation of succinic anhydride in the presence of palladium-on-carbon catalysts. These catalysts are extremely sensitive and are substantially deactivated or poisoned during this reaction. Thus, there is a real need for a method of reactivating these catalysts for reuse in this process.

It is an object of this invention to provide a method of reactivating palladium-on-carbon catalysts for reuse in the preparation of butyrolactone by the hydrogenation of succinic anhydride.

I have now found that spent palladium-on-carbon catalysts which have been used in the preparation of butyrolactone by the hydrogenation of succinic anhydride can be reactivated by treating the catalyst with a dilute alkali metal hydroxide solution, washing the catalyst with water until the wash water has a pH in the range of about 7.5–10, drying the catalyst, and exposing the catalyst to a gas containing oxygen. By reactivating the catalyst in this manner after each use, the catalyst can be reused for an extended number of times without any substantial reduction in activity.

The hydrogenation of succinic anhydride is illustrated by the following equation:

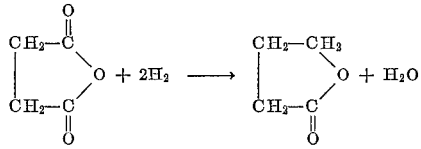

The hydrogenation reaction is suitably carried out by charging succinic anhydride, solvent, and catalyst to an agitated autoclave, and adding hydrogen to maintain the desired pressure. The agitation may be provided by any suitable means such as by using a shaking or stirred autoclave.

Yields in excess of 80% are obtained by operating in the liquid phase in the presence of specific solvents. The solvents which have been found to be suitable for this reaction include lower alkyl acetates such as methyl acetate, ethyl acetate, propyl acetate, n-butyl acetate, sec.-butyl acetate and amyl acetate, and dioxane. The preferred solvent is ethyl acetate.

The hydrogenation reaction should be carried out in the presence of sufficient solvent to dissolve a significant portion of the succinic anhydride, thereby providing a mobile reaction mixture and a rapid hydrogenation rate. Generally, the solvent should be present in a solvent to succinic anhydride weight ratio in the range of about 0.2–10:1. Preferably, the reaction medium contains about 0.5–5 parts of solvent per part of succinic anhydride.

Any of the commercially available palladium-on-carbon catalysts may be used. For good results, the catalyst should contain at least about 2% by weight of palladium deposited on activated charcoal. There is no advantage in having more than about 10% palladium deposited on the carrier. Commercial catalysts generally contain about 4–5% palladium. The catalyst should be present in an amount of at least about 4% by weight, based upon the succinic anhydride charged to the reactor. With less than about 4% of catalyst, the yield is somewhat diminished. The preferred amount of catalyst is about 5–9%, however greater amounts may be used, if desired. For example, as much as 100% has been used without any adverse effect. Of course, economic considerations favor lesser amounts.

Temperatures in the range of about 30–95° C. are suitable for carrying out the hydrogenation reaction. At temperatures of less than about 30° C. the reaction is rather slow and does not proceed to completion. Care should be taken to avoid temperatures as high as 100° C. until at least a major portion of the reaction has taken place, since the catalyst is poisoned by substantial quantities of succinic anhydride at these higher temperatures. If a heat-up procedure is used, in which the temperature is allowed to slowly rise from ambient temperature to some temperature in excess of 95° C., a major portion of the reaction should take place before the temperature reaches 100° C. Preferably, the reaction is carried out at temperatures of about 40–80° C.

Although variations in pressure do not have a great effect upon the reaction, pressures of at least about 200 p.s.i.g. should be used. Pressures in the range of about 500–2,000 p.s.i.g. are preferred, although pressures in excess of 2,000 p.s.i.g. may be used, if desired, without adverse effect.

When the hydrogenation of succinic anhydride is carried out using a fresh palladium-on-carbon catalyst under the preferred conditions, butyrolactone is obtained in yields of about 90% of theory. If this same catalyst is reused without regeneration, the yield drops to about 70%, and continues to drop further with each subsequent reuse. However, by regenerating the catalysts in the manner taught herein, the catalyst may be reused for an extended number of times without any substantial loss in activity.

Palladium-on-carbon catalysts are activated for reuse in the preparation of butyrolactone by treating the spent catalyst with a dilute alkali metal hydroxide solution, washing the catalyst with water, drying the catalyst, and exposing the catalyst to air. The hydroxide solution may be an aqueous or alcoholic solution. Although any of the alkali metal hydroxides may be used, sodium and potassium hydroxides are preferred for economic reasons. Best results are obtained with aqueous sodium hydroxide solutions.

The concentration of the hydroxide solution may vary over wide limits; for example, solutions containing from about 1–50% hydroxide are effective. Solutions containing less than about 1% hydroxide do not effectively regenerate the catalyst, while solutions containing more than 50% hydroxide require excessive washing to remove hydroxide from the catalyst. Solutions containing 5–10% hydroxide are preferred on the basis of effectiveness and convenience of handling.

Any suitable means for contacting the palladium-on-carbon catalyst with the hydroxide solution may be used. For example, the caustic solution may be percolated upward through a bed of catalyst, passed downward through a bed of catalyst, or slurried with the catalyst and separated by filtration or decantation.

The hydroxide-treated catalyst may be washed with water in any convenient manner, so as to remove most, but not all, of the hydroxide from the catalyst. The water washing of the catalyst may be carried out in a continuous manner by extracting hydroxide and catalyst poisons not affected by the hydroxide treatment using a continuous flow of water. The washing may also be accomplished batchwise by repeatedly slurrying the catalyst with water and filtering to remove the catalyst. Although the batch technique is somewhat less effective for the complete removal of water-soluble catalyst poisons, it is more convenient for controlled removal of hydroxide from the catalyst.

The desired level of residual alkalinity necessary for catalyst activity is achieved by washing the catalyst until the wash water has a pH in the range of about 7.5–10. Preferably, the wash water should have a pH in the range of about 8–9.

After the catalyst has been washed to the desired alkalinity, it is dried and briefly exposed to a gas containing oxygen. The drying and exposure to oxygen may be carried out as two separate steps, or as a single air-drying step. When separate steps are used, the drying step is carried out by blowing an inert gas such as nitrogen through the catalyst. The catalyst can then be exposed to air briefly while transferring it to the reactor, or while breaking up the dried catalyst cake. Although the length of time the catalyst is exposed to air is not critical, for good results it should be exposed for at least about 1 minute, and preferably for about 2–15 minutes.

The drying of the catalyst and exposure to oxygen may be carried out simultaneously by drying the catalyst with an oxygen-containing gas. Air may be used as the drying gas, however it is preferable that prolonged air blowing be avoided. The drying is suitably carried out by alternately blowing with nitrogen and then with air, or vice versa. When large quantities of catalyst are being dried, it may be desirable to use nitrogen-diluted air to avoid the generation of a large amount of heat during exposure to oxygen. It also may be desirable to blow air through slightly wet catalyst, thereby utilizing the exothermic heat to evaporate the moisture present in the catalyst.

The following examples, illustrating the novel method for reactivating palladium-on-carbon catalyst for reuse in the preparation of butyrolactone, are presented without any intention that the invention be limited thereto. All parts and percentages are by weight.

EXAMPLE 1

(a) One hundred parts of succinic anhydride, 450 parts of ethyl acetate and 8 parts of 4.5% palladium-on-carbon powder were charged to a stainless steel, rocking autoclave. The temperature was brought to 40° C. and agitation was begun. Hydrogen was charged to the autoclave at a pressure of 1200 p.s.i.g. Hydrogenation took place for 60 min. while the temperature was allowed to slowly rise to 75° C. The reaction mixture was then filtered through a medium porosity, sintered glass filter to remove the catalyst, and distilled at atmospheric pressure to remove ethyl acetate and water. The product residue was then distilled at reduced pressure to give 79 parts of a fraction boiling at 91–92° C. at 17 mm. Hg. This fraction was analyzed by vapor phase chromatography and found to contain 90% of the theoretical amount of butyrolactone.

(b) The catalyst on the filter was washed with 40 parts of ethyl acetate at room temperature to remove crude product. After drying for 10 min. with the aid of suction, the catalyst was slurried with 2 40-part portions of 5% aqueous sodium hydroxide at room temperature and filtered off after each portion. The catalyst was then slurried for 4 min. with 2 40-part portions of water, between each of which the catalyst was filtered off. The wet catalyst was then dried with filtered air for 10 min. during which time heat was evolved. The catalyst thus obtained was recycled to the autoclave and the hydrogenation repeated following the above procedure.

EXAMPLES 2–18

The catalyst from Example 1 was repeatedly reactivated and reused following the procedure of Example 1, except for the variations in the alkali wash step noted in the following table, until 18 recycles had been completed. Throughout this series of runs, the catalyst maintained substantially all of its original activity, although the weight of catalyst at the end of the series was only about 95% of the original charge.

The yield of butyrolactone and variations in procedure for Examples 1–18 are given in the following table:

Table 1

| Example | No. of Recycle | Butyrolactone Yield, percent of theory | Remarks |
|---|---|---|---|
| 1(a) | 0 | 90 | Fresh catalyst. |
| 1(b) | 1 | 91 | 5% aqueous NaOH. |
| 2 | 2 | 90 | Do. |
| 3 | 3 | 89 | Do. |
| 4 | 4 | 88 | Do. |
| 5 | 5 | 88 | Do. |
| 6 | 6 | 90 | Do. |
| 7 | 7 | 89 | Do. |
| 8 | 8 | 86 | 5% methanolic KOH. |
| 9 | 9 | 87 | Do. |
| 10 | 10 | 88 | 5% ethanolic KOH. |
| 11 | 11 | 85 | 5% aqueous NaOH. |
| 12 | 12 | 85 | Do. |
| 13 | 13 | 85 | Do. |
| 14 | 14 | 83 | Do. |
| 15 | 15 | 85 | 10% aqueous NaOH. |
| 16 | 16 | 86 | Do. |
| 17 | 17 | 88 | Do. |
| 18 | 18 | 84 | Do. |

EXAMPLE 19

The following example was carried out to show the effect of not regenerating the catalyst before reuse.

(a) One hundred parts of succinic anhydride, 400 parts of ethyl acetate, and 8 parts of 4.5% palladium-on-carbon powder were charged to a stainless steel, rocking autoclave. The temperature was brought to 50° C. and agitation was begun. Hydrogen was charged to the autoclave at a pressure of 1,000 p.s.i.g and hydrogenation took place for 60 min. while maintaining the temperature at 50° C. The reaction mixture was then filtered and the product was worked-up following the procedure in Example 1.

(b) The catalyst on the filter was washed with 40 parts of ethyl acetate at room temperature and dried for 10 min. with the aid of suction. The catalyst was then recycled to the autoclave without undergoing any reactivation, and the hydrogenation was repeated following the above procedure.

(c) The catalyst from the above hydrogenation was washed, dried and reused in the hydrogenation without reactivation following the above procedure.

(d) The catalyst from the above hydrogenation was washed and dried, as before, and reactivated in accordance with the procedure set forth in Example 1. The catalyst was then reused in the hydrogenation following the above procedure.

The yields of butyrolactone for this example are presented in the following table:

Table 2

| Example | No. of Recycle | Butyrolactone Yield, percent of theory | Remarks |
|---|---|---|---|
| 19(a) | 0 | 94 | Fresh catalyst. |
| 19(b) | 1 | 72 | No catalyst reactivation. |
| 19(c) | 2 | 36 | Do. |
| 19(d) | 3 | 92 | Reactivation in accordance with the invention. |

EXAMPLE 20

The following example was carried out to show the effect of improper washing of the catalyst and failure to expose the catalyst to oxygen.

(a) One hundred parts of succinic anhydride, 300 parts of ethyl acetate and 8 parts of 4.5% palladium-on-carbon powder were charged to a stainless steel, rocking autoclave. The temperature was brought to 40° C. and agitation was begun. Hydrogen was charged to the autoclave at a pressure of 1,200 p.s.i.g., and hydrogenation took place for 60 min. while maintaining the pressure in the range of 400–1,200 p.s.i.g. and allowing the temperature to rise to 75° C. The reaction mixture was then filtered and the product was worked-up following the procedure in Example 1.

(b) The catalyst on the filter was washed with 40 parts of ethyl acetate at room temperature. After drying for 10 min. with the aid of suction, the catalyst was slurried with 2 40-part portions of 5% aqueous sodium hydroxide at room temperature and filtered off after each portion. The catalyst was then slurried for 5 min. with 2 30-part portions of water, and filtered off after each portion. One hundred thirty parts of water was continuously passed through the catalyst on the filter, thereby completely removing all of the residual caustic on the catalyst. The wet catalyst was dried with filtered air for 10 min. during which time heat was evolved. The dry catalyst was then recycled to the autoclave and reused in the preparation of butyrolactone following the above procedure.

(c) The catalyst obtained from the above hydrogenation was washed with 40 parts of ethyl acetate at room temperature. After drying for 10 min. with the aid of suction, the catalyst was slurried with 2 40-part portions of 5% aqueous sodium hydroxide at room temperature and filtered off after each portion. The catalyst was then slurried for 4 min. with 2 40-part portions of water, between each of which the catalyst was filtered off. The wet catalyst was then dried for 45 min. with nitrogen and returned to the autoclave for recycle without being exposed to air. Succinic anhydride was hydrogenated using this catalyst following the above procedure.

(d) The catalyst obtained from the above hydrogenation was washed with 40 parts of ethyl acetate at room temperature to remove crude product. After drying for 10 min. with the aid of suction, the catalyst was regenerated in the manner set forth in Example 1.

The data obtained from this example are set forth in the following table:

Table 3

| Example | No. of Recycle | Butyrolactone Yield, percent of theory | Remarks |
|---|---|---|---|
| 20(a) | 0 | 91 | Fresh catalyst. |
| 20(b) | 1 | 45 | NaOH completely washed out. |
| 20(c) | 2 | 52 | No exposure to air. |
| 20(d) | 3 | 89 | Reactivation in accordance with the invention. |

As will be apparent to those skilled in the art, numerous modifications and variations of the specific alkali metal hydroxide solutions, washing techniques and drying techniques illustrated above may be made without departing from the spirit of the invention or the scope of the following claims.

I claim:

1. The method of reactivating a spent palladium-on-carbon catalyst for reuse in the preparation of butyrolactone by the hydrogenation of succinic anhydride which comprises contacting the catalyst with a 1–50% alkali metal hydroxide solution, washing said catalyst with water until the wash water has a pH in the range of 7.5–10, drying said catalyst, and exposing said catalyst to a gas containing free oxygen.

2. The method of reactivating a spent palladium-on-carbon catalyst for reuse in the preparation of butyrolactone by the hydrogenation of succinic anhydride which comprises contacting said catalyst with a 5–10% aqueous sodium hydroxide solution, washing said catalyst with water until the wash water has a pH in the range of 8–9, drying said catalyst, and exposing said catalyst to air for 2–15 minutes.

References Cited by the Examiner
UNITED STATES PATENTS

| 2,641,582 | 6/53 | Haensel | 252—416 |
| 2,704,281 | 3/55 | Appell | 252—416 |
| 2,806,004 | 9/57 | Milliken | 252—412 |
| 2,925,391 | 2/60 | Lait | 252—412 |

MAURICE A. BRINDISI, *Primary Examiner.*

BENJAMIN HENKIN, *Examiner.*